(12) United States Patent
Gong

(10) Patent No.: US 11,087,402 B2
(45) Date of Patent: Aug. 10, 2021

(54) METHOD AND DEVICE FOR PUSHING INFORMATION AND METHOD AND DEVICE FOR DETERMINING DEFAULT INPUT VALUE

(71) Applicant: Advanced New Technologies Co., Ltd., Grand Cayman (KY)

(72) Inventor: Tianqi Gong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/811,976

(22) Filed: Mar. 6, 2020

(65) Prior Publication Data

US 2020/0211118 A1 Jul. 2, 2020

Related U.S. Application Data

(63) Continuation of application No. PCT/CN2018/115587, filed on Nov. 15, 2018.

(30) Foreign Application Priority Data

Dec. 29, 2017 (CN) .......................... 201711482385.X

(51) Int. Cl.
*G06Q 40/02* (2012.01)
*G06Q 40/06* (2012.01)
(Continued)

(52) U.S. Cl.
CPC ......... *G06Q 40/06* (2013.01); *G06Q 30/0206* (2013.01); *G06Q 40/08* (2013.01)

(58) Field of Classification Search
None
See application file for complete search history.

(56) References Cited

U.S. PATENT DOCUMENTS

2012/0150736 A1* 6/2012 Dickerson .............. G06Q 40/02
705/40
2015/0199511 A1* 7/2015 Faile, Jr. ............ G06Q 10/0635
726/25
(Continued)

FOREIGN PATENT DOCUMENTS

| CN | 102638849 | 8/2012 |
|---|---|---|
| CN | 103258388 | 8/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Joseph W. King
(74) *Attorney, Agent, or Firm* — Fish & Richardson P.C.

(57) ABSTRACT

Implementations of the present specification provide fund-related service information. In an implementation, historical information of a fund item of a user is retrieved. A projected change of the fund item within a time period based on the historical information is determined. Fund-related service information based on the projected change of the fund item within the time period is determined. The fund-related service information to the user to compensate for the projected change is transmitted.

15 Claims, 3 Drawing Sheets

(51) Int. Cl.
*G06Q 30/02* (2012.01)
*G06Q 40/08* (2012.01)

(56) References Cited

U.S. PATENT DOCUMENTS

2015/0363862 A1  12/2015  Ranft et al.
2017/0213280 A1*  7/2017  Kaznady ................ G06N 20/00

FOREIGN PATENT DOCUMENTS

| CN | 103955821 | 7/2014 |
| CN | 106570592 | 4/2017 |
| CN | 106682067 | 5/2017 |
| CN | 106971321 | 7/2017 |
| CN | 106981011 | 7/2017 |
| CN | 107016557 | 8/2017 |
| CN | 107146158 | 9/2017 |
| CN | 107464185 | 12/2017 |
| CN | 108230140 | 6/2018 |
| TW | M541070 | 5/2017 |
| WO | WO 2017128395 | 8/2017 |

OTHER PUBLICATIONS

International Search Report and Written Opinion in PCT Appln. No. PCT/CN2018/115587, dated Feb. 19 2019, 10 pages (with partial English translation).
Nakamoto, "Bitcoin: A Peer-to-Peer Electronic Cash System," www.bitcoin.org, 2005, 9 pages.
PCT International Preliminary Report on Patentability in PCT Appln No. PCT/CN2018/115587, dated Jun. 30, 2020, 10 pages (with English translation).

* cited by examiner

METHOD AND DEVICE FOR PUSHING INFORMATION AND METHOD AND DEVICE FOR DETERMINING DEFAULT INPUT VALUE

CROSS-REFERENCE TO RELATED APPLICATIONS

This application is a continuation of PCT Application No. PCT/CN2018/115587, filed on Nov. 15, 2018, which claims priority to Chinese Patent Application No. 201711482385.X, filed on Dec. 29, 2017, and each application is hereby incorporated by reference in its entirety.

TECHNICAL FIELD

The present disclosure relates to the technical field of data analysis, and in particular, to a method and a device for pushing information, and a method and a device for determining a default input value.

BACKGROUND

The continuous progress of high and new technology has promoted financial innovation while promoting economic development. As a combination of finance and technology, Internet finance is playing an increasingly important role in daily life. Users can manage accounts, make payments, and purchase various financial products through the network.

A major advantage of Internet finance is convenience and efficiency. As an increasing number of people have joined user group of the Internet finance, differences in income and expenditure, wealth levels, and personal preferences of different users often limit further development in convenience and efficiency. Providing intelligent and personalized services for users has become the development trend of the Internet finance.

SUMMARY

In view of this, the present disclosure provides a method of pushing information, including: obtaining historical detail information of a fund item of a user; determining at least one characteristic time period within a predetermined time period with the historical detail information, wherein the fund item in a characteristic time period predicts the occurrence of an expected change; pushing fund-related service information to the user based on the at least one characteristic time period.

The present disclosure provides a method for determining default input value, including: obtaining historical detail information of a fund item of a user; determining at least one characteristic time period within a predetermined time period with the historical detail information, wherein the fund item in a characteristic time period predicts the occurrence of an expected change; generating a default input value of a user input item according to the characteristic time period.

The present disclosure also provides a device for pushing information, including: a detail information obtaining unit configured to obtain historical detail information of a fund item of a user; a characteristic time period unit configured to determine at least one characteristic time period within a predetermined time period with the historical detail information, wherein the fund item in a characteristic time period predicts the occurrence of an expected change; a service information pushing unit configured to push fund-related service information to the user based on the at least one characteristic time period.

The present disclosure also provides a device for determining a default input value, including: a detail information obtaining unit configured to obtain historical detail information of a fund item of a user; a characteristic time period unit configured to determine at least one characteristic time period within a predetermined time period with the historical detail information, wherein the fund item in a characteristic time period predicts the occurrence of an expected change; a default value generation unit configured to generate a default input value of a user input item according to the characteristic time period.

The present disclosure also provides a computer device including a processor and a memory having computer programs stored thereon that are executable by the processor to execute the steps of the method for pushing information.

The present disclosure also provides a computer device including a processor and a memory having computer programs stored thereon that are executable by the processor to execute the steps of the method of determining a default input value.

The present disclosure also provides a computer-readable storage medium configured with computer programs executable by a processor to cause the processor to execute the steps of the method of pushing information.

The present disclosure also provides a computer-readable storage medium configured with computer programs executable by a processor to cause the processor to execute the steps of the method of determining a default input value.

As can be seen from the above technical solution, in the method and device embodiment for pushing information in the present disclosure, based on the historical detail information of the user's fund item, the characteristic time period in which the fund item has an expected change within a predetermined time period is obtained through analysis, and service information is pushed to the user according to the characteristic time period, such that the information push can match the time when users have demands on the service. As such, unreasonable interruption to users can be reduced, and personalization and intelligence of services can be improved.

In the method and device embodiments for determining a default input value of the present disclosure, based on the historical detail information of the user's fund item, the characteristic time period in which the fund item will undergo an expected change within a predetermined time period is obtained through analysis, and the default value of the user input item is generated according to the characteristic time period, so that the default value of the input item can match the actual demand of the user, reduce the input operation of the user when filling in information, speed up the efficiency of information filling, and improve the personalization and intelligence of services.

DETAILED DESCRIPTION OF THE EXAMPLES

The first embodiment of the present disclosure proposes a new method of pushing information. From historical detail information of a user's fund item, a characteristic time period is determined in which the fund item will undergo an expected change within a predetermined time period, and service information is pushed to the user based on the at least one characteristic time period. Thereby, information can be pushed at a time when the user might have a demand on the service. The method can improve a success rate of service recommendation while reducing interruption, and can achieve personalized and intelligent information push for the user.

The first embodiment of the present disclosure can be run on any device with computing and storage capabilities, such as a mobile phone, a tablet computer, a PC (Personal Computer), a notebook, a server and other devices. Alternatively, various functions in the first embodiment of the present disclosure can be implemented by logical nodes running on two or more devices.

Figure 1:
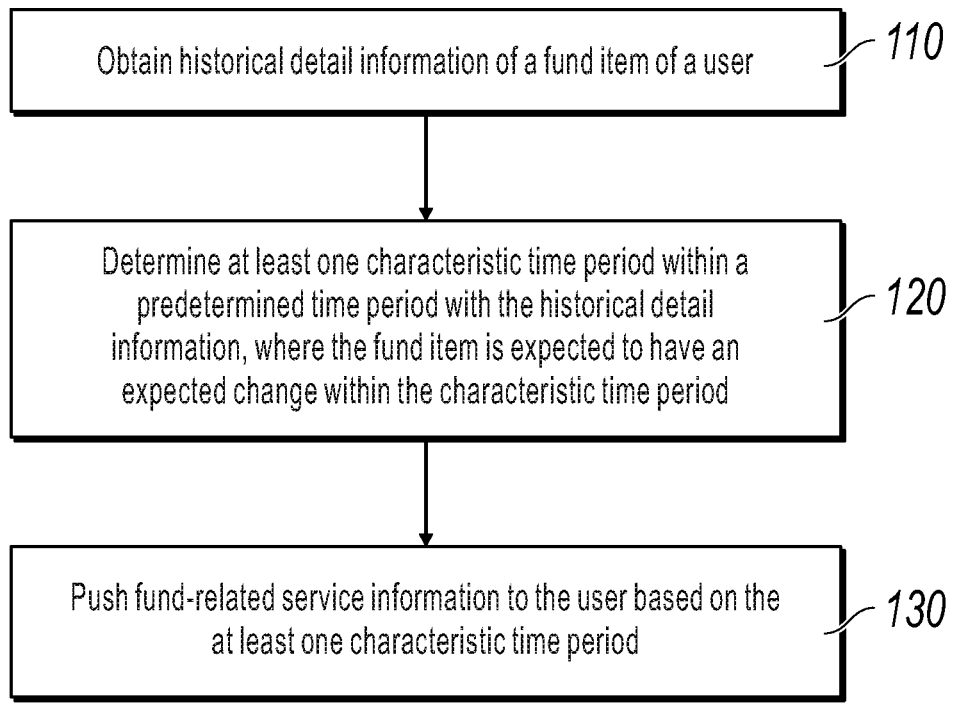
FIG. 1 is a flowchart of a method of pushing information in a first embodiment of the present disclosure.

In the first embodiment of the present disclosure, the process of the method of pushing information is shown in FIG. 1. The method is applied to a server of a financial service provider.

At step 110, historical detail information of a fund item of a user is obtained.

In some embodiments of the present disclosure, the user has a fund account on the server of the financial service provider, and the user can enjoy various services provided by the service provider, such as payment, collection, transfer, and purchase of financial products. When a financial activity related to assets or liabilities occurs in the user's account, the server usually records the financial activity, the changes in the assets or liabilities of the account, and the occurrence time into historical details, and stores the historical details.

Here, any one of a financial activities and changes in assets or liabilities of the account can be taken as a fund item in some embodiments of the present disclosure, such as income, expenditure, account balance, loan repayment, payment of a certain fees (such as communication fees, water fees), etc. In addition, one or more fund item may be involved in some embodiments of the present disclosure.

Some service providers allow a user to have more than one account. According to an implementation and demand of an actual application scenario, the historical detail information of the user's fund item can be historical detail information of a fund item of one user's account, or historical detail information of user's fund items of two or more user's accounts, which is not limited in the present disclosure.

The server can read the stored historical details of the user's account and extract historical detail information of one or more fund items therefrom.

At step 120, at least one characteristic time period is determined within a predetermined time period with the historical detail information, where the fund item is expected to have an expected change within the characteristic time period.

For many users, certain fund item or some fund items often undergo repetitive changes in a certain cycle. For example, salary income usually repeats on a monthly or weekly basis, and repayment of loans often repeats on a monthly or annual basis, and so on. For one or some fund items, according to historical detail information of the changes in the predetermined time period, one or more characteristic time periods in which the fund item will undergo expected changes may be obtained through analysis in the predetermined time period. For example, monthly or weekly paydays can be analyzed based on historical detail information of income, monthly or annual repayment times can be analyzed based on historical detail information of loan repayments, and a time in each month or each year when the account balance is below a certain threshold can be analyzed based on historical detail information of account balances, and so on.

The server can use any analysis method that meets the needs of actual application scenarios to obtain the characteristic time period, which is not limited in some embodiments of the present disclosure. The following describes two implementations as examples.

In the first implementation, historical detail information is used to calculate statistical values for each time period during which the fund item changes within the predetermined time period, and a time period that meets a statistical condition for an expected change is determined as a characteristic time period. According to the needs of the actual application scenario and the features of the fund item, statistics are made on various parameters of the changes of the fund item, and these parameters are used to set the statistical condition for the expected change. For example, the parameters can be the number of changes in the fund item, and the frequency of changes, the amount of the change, and/or balance after change, etc., and the statistical condition for the expected change may be: at least one of the frequency of changes in the fund item meets a first condition, the amount of change meets a second condition, or the balance after the change meets a third condition.

For example, taking month as the predetermined time period and the income as the fund item, counting the number of times the user has funds transferred in each day of each month in the recent year, and the total amount of the funds transferred in on that day, when the number of times of funds transferred in on a certain day exceeds a first threshold, and a ratio of the amount of the funds transferred in on that day against the total amount of funds transferred in of the whole year exceeds a second threshold, that day is regarded as an expected payday of the user.

In the second implementation, historical detail information of a item is input into a classification model of machine learning algorithm to obtain the at least one characteristic time period within the predetermined time period. Here, the classification model of machine learning algorithm takes the historical detail information of the item as input and one or more characteristic time periods as outputs. The classification model was trained with labeled training samples (that is, historical detail information labeled as having a time period in which the item will undergo an expected change within a predetermined cycle).

At step 130, based on the at least one characteristic time period, fund-related service information is push to the user.

After analyzing one or more characteristic time periods of the user within the predetermined time period, fund-related service information can be push to the user according to the characteristic time period in each predetermined time period. The service information can be pushed before, within, and after the characteristic time period within the predetermined time period, or can be pushed at a certain time length from the characteristic time period within the predetermined time period, which is not limited.

The fund-related service information can be any financial service information that the user may be interested in, which is not limited. At the time of the push, the financial service is either in line with the user's economic ability at the time, or can facilitate the user's financial operations, or can provide other conveniences for the user.

For example, tanking income as a fund item, when it is determined from analysis that the user has funds transferred in (expected change) every month. Assuming the characteristic time period is the last day of each month, wealth management information can be pushed to the user on the first day of each month.

In one implementation, the change in the user's fund item can be monitored in a time period determined according to the characteristic time period. After detecting the expected changes in the fund item, fund-related service information is pushed to the user. For example, the account balance can be used as a fund item to analyze the characteristic time period when the user's monthly account balance falls below a preset value; and the user's account balance is monitored at the beginning of the characteristic time period, and if the account balance falls below the preset value, loan service information is pushed to the user.

It can be seen that in the first embodiment of the present disclosure, based on the historical detail information of the user's fund item, the characteristic time period in which the fund item has an expected change within the predetermined time period is obtained through analysis, and service information is pushed to the user according to the characteristic time period, such that the information push can match the time when users have demands on the service. It can reduce the interruption to users, improve the success rate of recommending services and improve the personalization and intelligence of services.

The second embodiment of the present disclosure proposes a new method of determining a default input value. From the historical detail information of the user's fund item, a characteristic time period in which the fund item will undergo an expected change within the predetermined time period is determined, and based on the characteristic time period, the default value of the input item of the user is obtained, so that the default value of the input item can match the actual demand of the user, which can reduce the operation of the user when inputting information, and implement personalized and intelligent recommendation information for the user.

The second embodiment of the present disclosure can be run on any device with computing and storage capabilities, such as mobile phones, tablet computers, PCs (Personal Computers), notebooks, servers and other devices; or various functions of the second embodiment of the present disclosure can be implemented by logical nodes of two or more devices.

Figure 2:
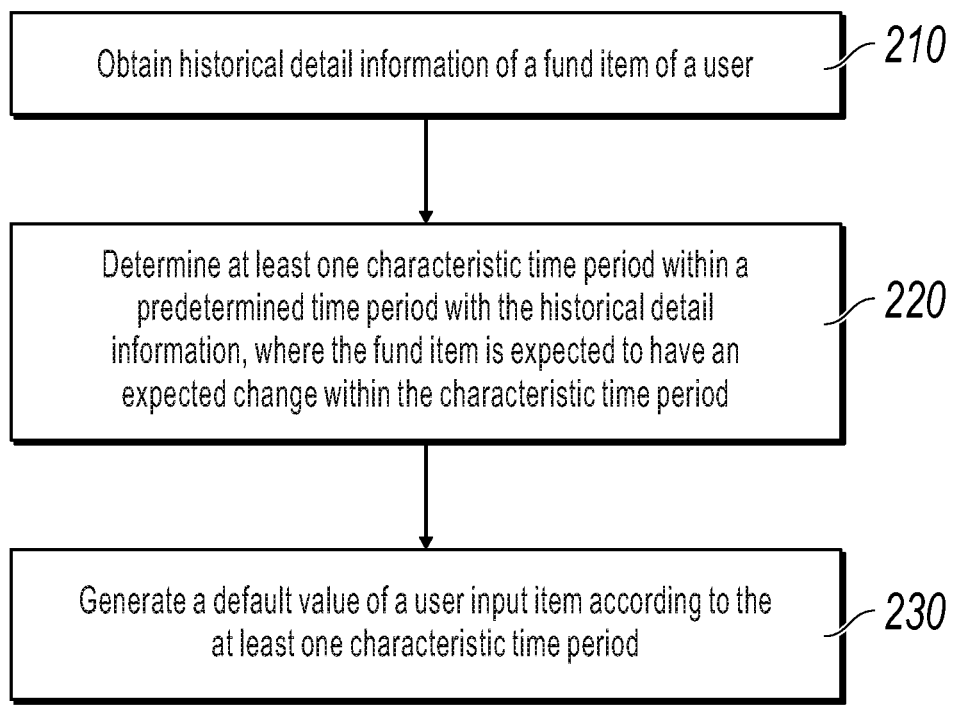
FIG. 2 is a flowchart of a method of determining a default input value in a second embodiment of the present disclosure.

In the second embodiment of the present disclosure, the process of determining a method for inputting a default value is shown in FIG. 2, and the method is applied to a server of a financial service provider.

At step 210, historical detail information of a fund item of a user is obtained.

At step 220, at least one characteristic time period is determined within a predetermined time period with the historical detail information, where the fund item is expected to have an expected change within the characteristic time period.

Steps 210 and 220 in the second embodiment of the present disclosure are the same as steps 110 and 120 in the first embodiment, respectively. For a detailed description of the above two steps, reference can be made to the first embodiment, which will not be repeated.

At step 230, a default value of a user input item is generated according to the at least one characteristic time period.

The user input item is an information item that the server asks the user to enter when the user uses the account for various financial activities. The input items can be input by the user or can be selected by the user; the input item can be in the form of a text box or in the form of options; which is not limited in some embodiments. The default value of the input item is the default content or default option given by the server. When the user does not make any changes to the input item, the value of the input item submitted to the server is default value.

After one or more characteristic time periods within the predetermined time period is obtained through analysis for the user, the default value of the user input item can be generated in each predetermined time period according to the characteristic time period. The specific manner of generating the default value of the input item according to the characteristic time period may be determined according to factors such as the characteristics of the fund account and the input item, and the actual demand of the application scenario, which is not limited in some embodiments of the present disclosure.

In an example, taking income as a fund item to obtain through analysis the characteristic time period in which the user has funds transferred in each month (expected change) on a certain day (a fund accounted date), for example, then dates for the user to perform some transactions such as an input item of an automatic deduction day, an input item of a repayment reminder day are set as the fund accounted date, or the day after the fund accounted day, so that the user does not need to manually enter the date, which can conveniently enable users to settle the liabilities of each month at a time with sufficient funds in that month.

It can be seen that in the second embodiment of the present disclosure, based on the historical detail information of the user's fund item, the characteristic time period in which the fund item will undergo an expected change within the predetermined time period is obtained through analysis, and the default value of the user input item is generated according to the characteristic time period, so that the default value of the input item can match the actual demand of the user, reduce the input operation of the user when filling in information, and speed up the efficiency of information filling.

Specific embodiments of the present disclosure have been described above. Other embodiments are within the scope of the following claims. In some cases, the actions or steps recited in the claims may be performed in a different order than in some embodiments and the desired result may still be achieved. In addition, the processes depicted in the figures do not necessarily require the particular order or sequential order illustrated to achieve the desired results. In some embodiments, multitasking and parallel processing are also possible or may be advantageous.

In the first and second application examples of the present disclosure, after opening an account with a financial integrated service platform, users can receive and disburse funds and purchase various wealth management products, such as funding, bonds, gold, stocks, etc. The financial integrated service platform maintains details of each historical revenue and expenditure and transaction of the account for each user.

The main user group of this financial integrated service platform is office workers. Generally speaking, wages will be paid on a fixed day every month and extended on weekends; or on a working day of a week. The server of this financial service platform extracts the user's detailed income information for the past two years. The detailed information includes the date and amount of each income.

The server uses the month as the predetermined time period to count how many times a day's income is received in a month and the total amount of income received on that day. If the day of each month has the largest number of times and the largest total income (a statistical condition for the expected change), the day of each month is used as the payday (a characteristic time period); if a certain weekday of each month has the largest number of times and the largest total income, the weekday of each month is used as the payday.

In the first application example, after the user's payday is obtained through analysis of the detailed income information, the server starts to monitor the user's account on the day before the payday, when it is monitored the income is transferred in, recommendation message of wealth management product is push to the user, for the user to choose to purchase. By pushing the wealth management message immediately after the user gets the income, which can reduce the interruption to the user, help the user develop good wealth management habits, and help increase the transaction volume of wealth management transactions.

Figure 3:
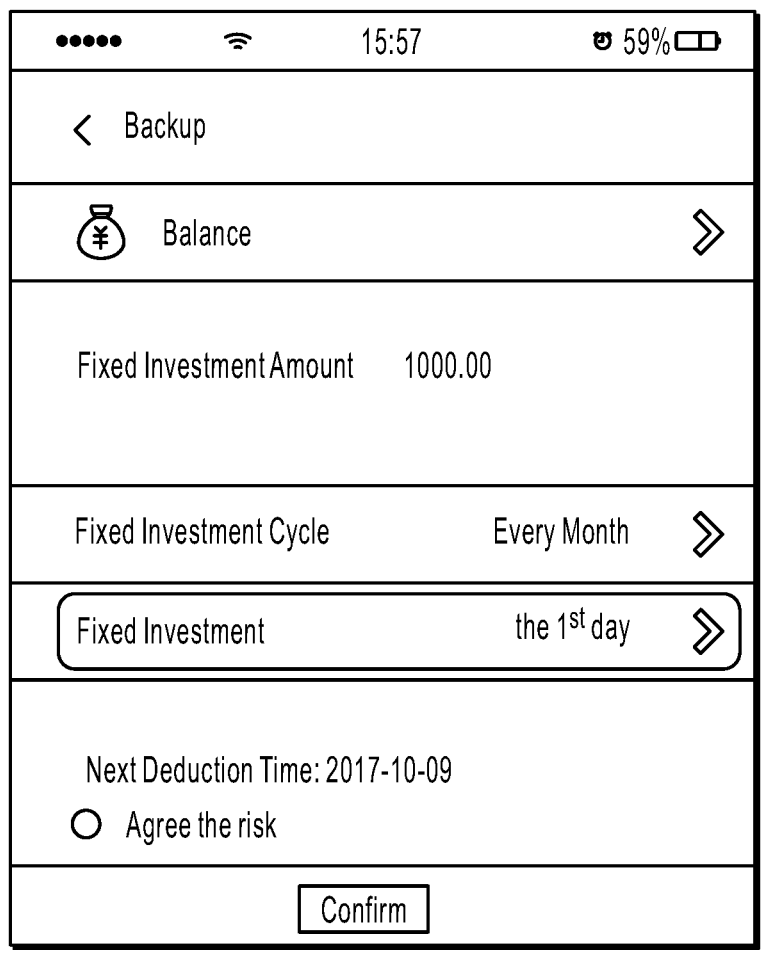
FIG. 3 is a schematic diagram of an input interface of a fixed investment day in a second application example of the present disclosure.

In the second application example, after the user's payday is obtained through analysis of the detailed income information, when the user deals a fixed investment funding transaction, the server treats the second day of the user's payday as the default value of the input item of the fixed investment day (automatic deduction date). Assuming that the server's analysis shows that the payday of a user is the last day of each month, when the user deals a fixed investment funding transaction, a setup page for a fixed investment day is shown in FIG. 3. The server has already set the default value of the user's fixed investment day to the first day of the month. The user no longer needs to manually select their own paydays, which can reduce user operations.

Figure 4:
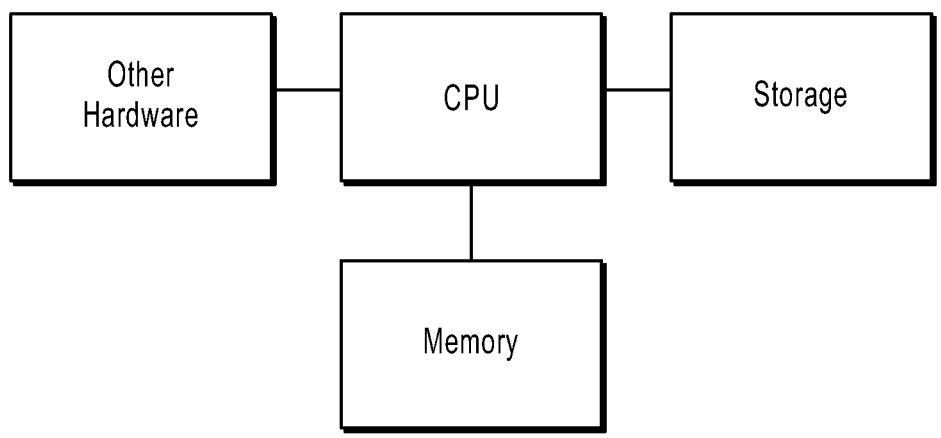
FIG. 4 is a block diagram of hardware of a device running the embodiment of the present disclosure.

Corresponding to the above process implementation, the embodiments of the present disclosure further provide a device for pushing information, and a device for determining a default input value. Both of these devices can be implemented by software, or by hardware or a combination of software and hardware. Taking software implementation as an example, as a device in a logical sense, the device is formed by reading a corresponding computer program instruction into a memory through a CPU (Central Process Unit) of a device where the device is located. From the hardware level, in addition to the CPU, the memory, and the storage shown in FIG. 4, the device where the device for pushing information or the device for determining a default input value usually includes other hardware such as a chip for wireless signal transmission and reception, and/or other hardware such as boards used to implement network communication functions.

Figure 5:
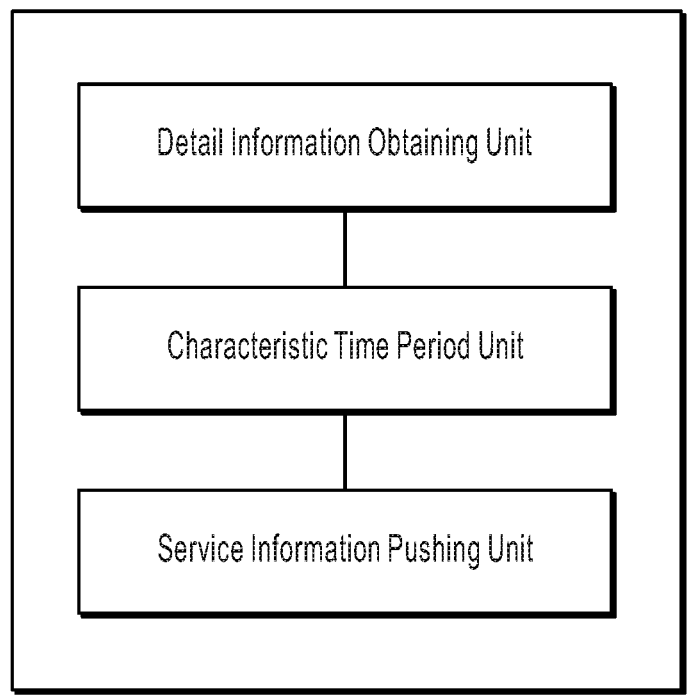
FIG. 5 is a logical block diagram of a device for pushing information in some embodiments of the present disclosure.

FIG. 5 shows a device for pushing information provided by an embodiment of the present disclosure, which includes a detail information obtaining unit, a characteristic time period unit, and a service information pushing unit. The detail information obtaining unit is configured to obtain historical detail information of a fund item of a user. The characteristic time period unit is configured to determine at least one characteristic time period within a predetermined time period with the historical detail information, where the fund item is expected to have an expected change within the characteristic time period. The service information pushing unit is configured to push fund-related service information to the user based on the at least one characteristic time period.

In an implementation, the characteristic time period unit is configured to calculate statistical values for each time period during which the fund item changes within the predetermined time period by using the historical detail information, and determine a time period that meets a statistical condition for an expected change as a characteristic time period.

In the above implementation, the statistical condition for an expected change may include: at least one of the frequency of changes in the fund item meets a first condition, the amount of change meets a second condition, or the balance after the change meets a third condition.

In another implementation, the characteristic time period unit is configured to input the historical detail information of the item into a classification model of machine learning algorithm to obtain at least one characteristic time period within the predetermined time period; where the classification model was trained with training samples labeled with characteristic time periods.

Optionally, the service information pushing unit is configured to monitor change in the fund item of the user according to the characteristic time period; and after detecting the expected change in the fund item, push fund-related service information to the user.

Optionally, the fund item includes: income; the expected change includes: fund transferred in; and the fund-related service information includes: wealth management service information.

Figure 6:
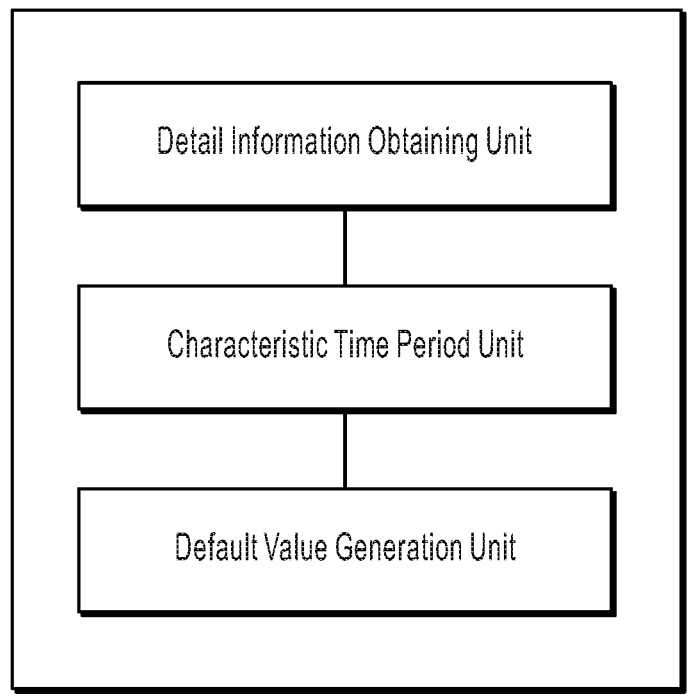
FIG. 6 is a logical block diagram of a device for determining a default input value in an embodiment of the present disclosure.

FIG. 6 shows a device for determining a default input value provided by an embodiment of the present disclosure, including a detail information obtaining unit, a characteristic time period unit, and a default value generation unit. The detail information obtaining unit is configured to obtain historical detail information of a fund item of a user. The characteristic time period unit is configured to determine at least one characteristic time period within a predetermined time period with the historical detail information, where the fund item is expected to have an expected change within the characteristic time period. The default value generation unit is configured to generate a default value of a user input item according to the characteristic time period.

In an implementation, the characteristic time period unit is configured to calculate statistical values for each time period during which the fund item changes within the predetermined time period by using the historical detail information, and determine a time period that meets a statistical condition for an expected change as a characteristic time period.

In the above implementation, the statistical condition for an expected change may include: at least one of the frequency of changes in the fund item meets a first condition, the amount of change meets a second condition, or the balance after the change meets a third condition.

In another implementation, the characteristic time period unit is configured to input the historical detail information of the item into a classification model of machine learning algorithm to obtain the at least one characteristic time period within the predetermined time period; where the classification model was trained with training samples labeled with characteristic time periods.

Optionally, the fund item includes: income; the expected change includes: fund transferred in; and the user input item includes: one or more of automatic deduction day and repayment reminder day.

An embodiment of the present disclosure provides a computer device including a memory and a processor. The memory stores a computer program that can be run by a processor. When the processor runs the stored computer program, the processor executes each step of the method of pushing information in some embodiments of the present disclosure. For a detailed description of each step of the method of pushing information, reference can be made to the above, which will not be repeated.

An embodiment of the present disclosure provides a computer device including a memory and a processor. The memory stores a computer program that can be run by a processor. When the processor runs the stored computer program, the processor executes each step of the method of determining a default input value in some embodiments of the present disclosure. For a detailed description of each step of the method of determining a default input value, reference can be made to the above description, which will not be repeated.

An embodiment of the present disclosure provides a computer-readable storage medium on which computer programs are stored. When these computer programs are executed by a processor, each step of the method of pushing information in some embodiments of the present specification is performed. For a detailed description of each step of the method of pushing information, reference can be made to the above description, which will not be repeated.

An embodiment of the present specification provides a computer-readable storage medium on which computer programs are stored. When these computer programs are executed by a processor, each step of the method of determining a default input value in some embodiments of the present specification is performed. For a detailed description of each step of the method of determining a default input value, reference can be made to the above description, which will not be repeated.

The above description is only the preferred embodiments of the present disclosure and is not intended to limit this application. Any modification, equivalent substitution, or improvement made within the spirit and principle of the present application shall be included within the scope of the present application.

In a typical configuration, a computing device includes one or more processors (CPUs), input/output interfaces, network interfaces, and a memory.

The memory may include a non-permanent memory, a random access memory (RAM), and/or a non-volatile memory in computer-readable media, such as a read-only memory (ROM) or a flash RAM. The memory is an example of a computer-readable medium.

The computer-readable medium includes either permanent or non-permanent, either removable or non-removable medium, and can implement information storage by any method or technology. Information may be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technology, a read-only disc, a read-only memory (CD-ROM), a digital versatile disc (DVD) or other optical storage, a magnetic tape cartridge, magnetic tape storage or other magnetic storage device or any other non-transmitting medium, which may be used to store information that can be accessed by a computing device. As defined herein, the computer-readable medium does not include temporary computer-readable medium (transitory medium), such as modulated data signals and carrier waves.

It should also be noted that the terms "including", "comprising" or any other variation thereof are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

It should be understood by those skilled in the art that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program code.

Implementations of the present application can solve technical problems in risk mitigation, so as to realize one or more of the following advantages. Automatically obtaining and processing of historical data to determine a projected change can improve the efficiency of risk mitigation. Setting a time period for the processed data and dynamically adjusting the time period enables adaptation to flexibility of changing a risk mitigation strategy. The dynamic monitoring of data enables the risk control strategy to be carried out more accurately and securely to ensure the integrity of data and stored funds.

What is claimed is:

1. A computer-implemented method, the computer-implemented method comprising:
retrieving, by one or more processors, historical information of an item of a user;
providing, by the one or more processors, as input the historical information to a classification model of a machine learning algorithm, wherein the classification model of the machine learning algorithm is configured to process the historical information and provides as output a projected change of one or more parameters of the item within a time period, wherein the time period is dynamically adjusted by determining statistical values for each of a plurality of time periods, during which the one or more parameters of the item change, by using the historical information and by determining the time period based on a statistical condition for an expected change as a characteristic time period of the plurality of time periods;
determining, by the one or more processors, service information for the item based on the projected change of the one or more parameters of the item within the time period by providing the historical information of the item as input for the classification model of the machine learning algorithm that was trained with labeled time periods comprising expected changes of the one or more parameters of the item;

generating, by the one or more processors, a management suggestion for the item based on the service information, the management suggestion comprising a default value for the item, a suggested item service, and a performance frequency for the suggested item service within the time period;

transmitting, by the one or more processors, the management suggestion configured to be displayed on a graphical user interface of a user device;

monitoring, by the one or more processors, current information of the item of the user; and adjusting, by the one or more processors, the time period based on the current information of the item of the user.

2. The computer-implemented method of claim 1, wherein the statistical condition comprises:

satisfying a first condition by a frequency of the projected change of the one or more parameters of the item;

satisfying a second condition by comparing the projected change of the one or more parameters of the item to a change amount; or satisfying a third condition by comparing the projected change of the one or more parameters of the item to a change balance.

3. The computer-implemented method of claim 1, further comprising:

monitoring a change of the item of the user during the time period;

determining that the projected change of the one or more parameters of the item occurred; and in response to determining that the projected change of the one or more parameters of the item occurred, transmitting the service information to the user.

4. The computer-implemented method of claim 1, wherein the service information comprises management service information for the item.

5. The computer-implemented method of claim 1, further comprising:

processing the historical information to determine whether the item of the user was below a threshold.

6. A non-transitory, computer-readable medium storing one or more instructions executable by a computer system to perform operations comprising:

retrieving historical information of a item of a user;

providing as input the historical information to a classification model of a machine learning algorithm, wherein the classification model of the machine learning algorithm is configured to process the historical information and provides as output a projected change of one or more parameters of the item within a time period, wherein the time period is dynamically adjusted by determining statistical values for each of a plurality of time periods, during which the one or more parameters of the item change, by using the historical information and by determining the time period based on a statistical condition for an expected change as a characteristic time period of the plurality of time periods;

determining service information for the item based on the projected change of the one or more parameters of the item within the time period by providing the historical information of the item as input for the classification model of the machine learning algorithm that was trained with labeled time periods comprising expected changes of the one or more parameters of the item;

generating a management suggestion for the item based on the service information, the management suggestion comprising a default value for the item, a suggested item service, and a performance frequency for the suggested item service within the time period;

transmitting the management suggestion configured to be displayed on a graphical user interface of a user device;

monitoring current information of the item of the user; and adjusting the time period based on the current information of the item of the user.

7. The non-transitory, computer-readable medium of claim 6, wherein the statistical condition comprises:

satisfying a first condition by a frequency of the projected change of the one or more parameters of the item;

satisfying a second condition by comparing the projected change of the one or more parameters of the item to a change amount; or satisfying a third condition by comparing the projected change of the one or more parameters of the item to a change balance.

8. The non-transitory, computer-readable medium of claim 6, the operations further comprising:

monitoring a change of the item of the user during the time period;

determining that the projected change of the one or more parameters of the item occurred; and in response to determining that the projected change of the one or more parameters of the item occurred, transmitting the service information to the user.

9. The non-transitory, computer-readable medium of claim 6, wherein the service information comprises management service information for the item.

10. The non-transitory, computer-readable medium of claim 6, the operations further comprising:

processing the historical information to determine whether the item of the user was below a threshold.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

retrieving historical information of a item of a user, providing as input the historical information to a classification model of a machine learning algorithm, wherein the classification model of the machine learning algorithm is configured to process the historical information and provides as output a projected change of one or more parameters of the item within a time period, wherein the time period is dynamically adjusted by determining statistical values for each of a plurality of time periods, during which the one or more parameters of the item change, by using the historical information and by determining the time period based on a statistical condition for an expected change as a characteristic time period of the plurality of time periods, determining service information for the item based on the projected change of the one or more parameters of the item within the time period by providing the historical information of the item as input for the classification model of the machine learning algorithm that was trained with labeled time periods comprising expected changes of the one or more parameters of the item, generating a management suggestion for the item based on the service information, the management suggestion comprising a default value for the item, a suggested item service, and a performance frequency for the suggested item service within the time period, transmitting the management suggestion configured to be displayed on a graphical user interface of a user device, monitoring current information of the item of the user, and adjusting the time period based on the current information of the item of the user.

12. The computer-implemented system of claim 11, wherein the statistical condition comprises:

satisfying a first condition by a frequency of the projected change of the one or more parameters of the item;

satisfying a second condition by comparing the projected change of the one or more parameters of the item to a change amount; or satisfying a third condition by comparing the projected change of the one or more parameters of the item to a change balance.

13. The computer-implemented system of claim 11, the operations further comprising:

monitoring a change of the item of the user during the time period;

determining that the projected change of the one or more parameters of the item occurred; and in response to determining that the projected change of the one or more parameters of the item occurred, transmitting the service information to the user.

14. The computer-implemented system of claim 11, wherein the service information comprises management service information for the item.

15. The computer-implemented system of claim 11, the operations further comprising:

processing the historical information to determine whether the item of the user was below a threshold.

* * * * *